(No Model.)
L. HARRIS.
THILL COUPLING.
No. 245,948. Patented Aug. 23, 1881.
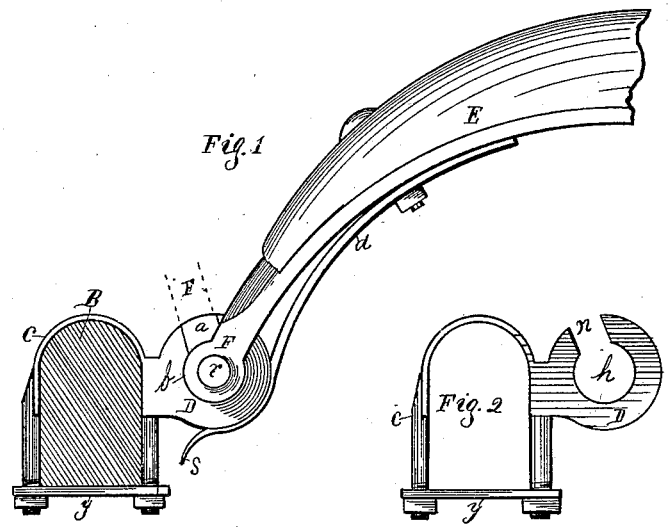
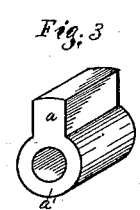
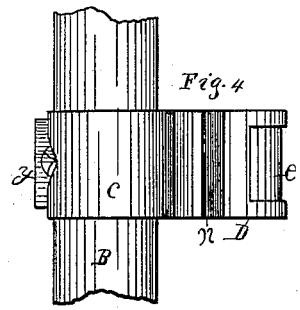
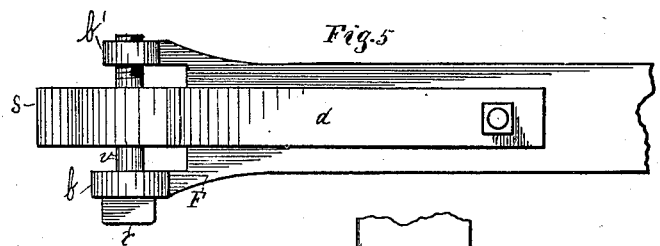
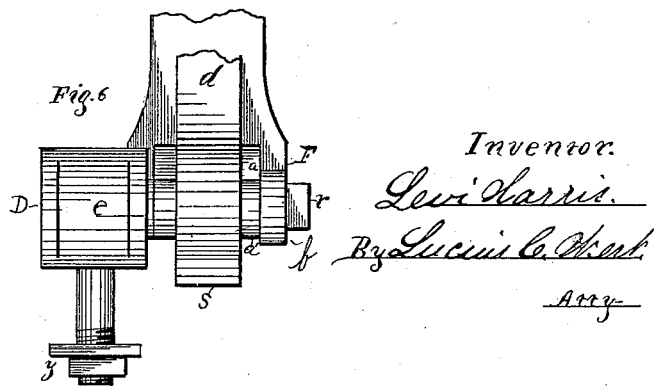
Attest.
John C Perkins
Joseph L Halsopp
Inventor.
Levi Harris
By Lucius C Kent
Atty.

United States Patent Office.

LEVI HARRIS, OF KALAMAZOO, MICHIGAN, ASSIGNOR TO HIMSELF AND ROSWELL E. JAMES, OF SAME PLACE.

THILL-COUPLING.

SPECIFICATION forming part of Letters Patent No. 245,948, dated August 23, 1881.

Application filed June 17, 1881. (No model.)

*To all whom it may concern:*

Be it known that I, LEVI HARRIS, a citizen of the United States, residing at Kalamazoo, county of Kalamazoo, State of Michigan, have invented a new and useful Thill and Pole Coupler, of which the following is a specification.

My invention relates to devices for coupling vehicle thills and poles with the forward axle, or the clip confining the same.

It has for its object the construction of a simple, cheap, and unconspicuous coupler, in which all the wear of parts comes on the draft-bolt, and a non-revoluble detachable thimble located on the same. Other features of novelty and utility are set forth in the detailed description.

The general construction of my device consists in a socket made integral with the axle-clip, which is provided with a circular recess and angular opening, in which the thimble surrounding the draft-bolt is located, said bolt coupling the eye of the thill with said socket in such a manner that the eye with bolt and thimble are readily detached from the recess and opening of the socket. The thill is also provided with a spring engaging a recess in front under side of the socket, for purposes hereinafter explained.

In the drawings, forming a part of this specification, in which similar letters of reference indicate like parts, Figure 1 is a side view of of the coupler and thill and cross-section of axle; Fig. 2, side view of axle-clip and integral open socket; Fig. 3, draft-bolt thimble; Fig. 4, top view of axle-clip and socket; Fig. 5, under view of eye end and the spring; and Fig. 6 front view of coupler, showing mode of operation.

C is a clip confining axle B, having socket D integral therewith, and provided with a circular recess, $h$, and angular opening $n$.

E is the thill, having the eye end F, with its two ears, $b$ $b'$, made one smaller than the other, in which coupling or draft bolt $v$ is located, it being screwed into the small ear $b'$. On this bolt thimble $a'$ is located, Figs. 1, 3, 6. This thimble has an angular projection, $a$, and is adapted to accurately fit in the recess $h$ and opening $n$ of socket D. This construction prevents the thimble from revolving, and admits of the eye with bolt and thimble being detached from the socket D.

To the thill E or the metal strap-extension of eye F is secured spring $d$. This spring is adapted to conform to the shape of the circular socket D, where it engages it in recess $e$, and terminates with end $s$ to operate it by when coupling or uncoupling the device.

Springs have previously been employed in thill-couplers in a different manner to prevent rattling of connecting parts; but by referring to Figs. 1 and 4 it will be observed that my spring $d$, by means of the raised edges of recess $e$, prevents any liability of the device becoming accidentally uncoupled, as well as serving to prevent any rattling of parts. My invention, however, is operative without the spring, as it could not become accidentally uncoupled, unless the thill became raised, till eye end F was in position shown by dotted lines in Fig. 1, (to which position it is carried when purposely uncoupling it,) which would be a rare occurrence, if possible at all. Hence, as stated, the spring is employed to obviate contingent danger.

In operating my device the thills are placed in position and the small end $b'$ of each eye entered in the socket recess and opening $h$ and $n$, observing, of course, to first locate the thimble $a'$ on the bolt, as in Fig. 6. In sliding the parts together when the spring $d$ intercepts the side of socket D it is sprung back and allowed to catch on the edge of said socket. When both sides of the thills are thus adjusted they are readily passed into place, and the springs drop into recess $e$, the larger ear $b$ preventing the eye from being passed too far in the socket. Then by dropping the thills to the natural position, as when connected with the harness of a horse, Fig. 1, the device cannot uncouple, even if spring $d$ is not employed, as stated. The device is uncoupled in the reverse order.

As all the wear of the parts coupled together comes on bolt $v$ and thimble $a'$ in the hole in which the bolt is located these parts can be readily and cheaply replaced. Thus the most expensive parts do not wear out, as in certain previous constructions.

What I claim as new, and desire to secure by Letters Patent, is—

1. A thill-coupling device having an axle-clip provided with a socket, the socket provided with the recess and opening, bearing a non-revoluble and detachable thimble conforming to the shape of said recess and having a hole through the same for the reception of the draft-bolt, all substantially as set forth.

2. The combination, in a thill-coupler, of the socket provided with the circular recess and angular opening, bearing the non-revoluble detachable thimble provided with the bolt-hole, with the eye end of the thill, having ears, one larger than the other, bearing the draft-bolt, all substantially as described and shown.

3. The recessed socket having the recess with raised sides for receiving the spring, the thimble, and the eye end of the thill provided with the spring engaging said spring-recess, all in combination, substantially as described.

4. The combination, substantially as set forth, of socket D, with recess $h$, opening $n$, and recess $e$, thimble $a'$, with projection $a$, eye end F, with ears $b$ and $b'$, bolt $v$, and spring $d$, for the object specified.

LEVI HARRIS.

Witnesses:
ROSWELL E. JAMES,
A. SYDNEY HAYS.